Sept. 15, 1925.
J. R. CAUTLEY
BRAKE DRUM
Filed March 11, 1924
1,553,670
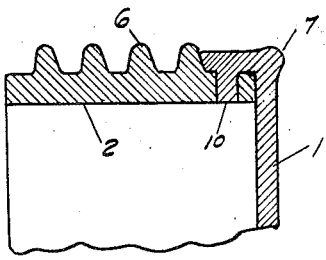
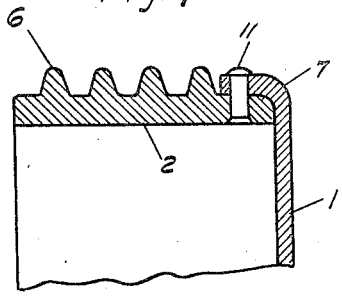
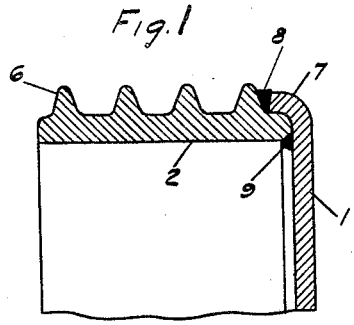 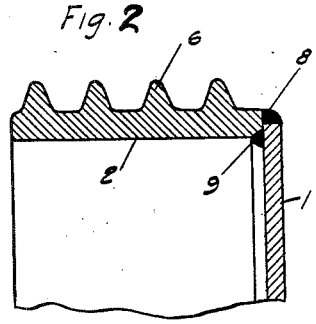
INVENTOR
JOHN R. CAUTLEY
BY
A. D. T. Libby
ATTORNEY Patented Sept. 15, 1925.

1,553,670

UNITED STATES PATENT OFFICE.

JOHN RANDOLPH CAUTLEY, OF SOUTH BEND, INDIANA, ASSIGNOR TO BENDIX BRAKE COMPANY, A CORPORATION OF ILLINOIS.

BRAKE DRUM.

Application filed March 11, 1924. Serial No. 698,463.

*To all whom it may concern:*

Be it known that I, JOHN R. CAUTLEY, a citizen of the United States, residing at South Bend, in the county of St. Joseph, State of Indiana, have invented certain new and useful Improvements in Brake Drums, of which the following is a description, reference being had to the accompanying drawing and to figures of reference marked thereon.

This invention relates to brake drums especially those used with automotive vehicles. On account of the greatly increased traffic, better braking facilities on automotive vehicles are required than heretofore. This in general means heavier brake drums are required with modern brakes and this in turn means a greater expense not only in the cost of producing the brake drums but in the cost of equipment required to make the heavier drums.

It is the principal object of my invention to provide a construction in which greater rigidity of the brake drum, as well as better heat transferring means can be obtained, resulting in cooler brakes and a decrease in the combined weight of the brake and drum as compared with the ordinary construction required to take care of a given amount of work to be performed. My improvements in brake drum construction will be best understood by reference to the attached drawing, wherein:

Figure 1 is a fragmentary section in which the ring portion of the drum is of good braking material, such as cast iron, having a head portion of strong sheet metal, such as steel, the two parts being joined together as by one or more welds, or by brazing.

Figure 2 is a construction somewhat like Fig. 1, but in which the head of the drum is an annular disc welded to the ring portion of cast iron.

Figure 3 is a modified form of construction in which the drum ring is of cast material, preferably cast iron, to which is cast a drum head of light metal, such as aluminum.

Figure 4 is a further modified construction in which the drum head may be a stamping or a casting of light metal, such as aluminum, shrunk on or riveted to the drum ring.

Referring now to the details wherein like numbers refer to corresponding parts in the various views, 1 is a head portion of a brake drum having a ring portion 2 of suitable braking material.

In Fig. 1 the head of the drum 1 is preferably made of strong sheet material, such as steel, in which the edge 7 is bent over the edge of the ring 2 and welded thereto as indicated at 8 and 9. The ring 2 in this case is preferably made of cast iron and as shown may be given great radiating ability with fins 6 as well as considerable strength, the total weight of the drum being kept down by using a sheet steel supporting head of much thinner cross section than the thickness of the body portion 2 of the drums. The same applies to the construction shown in Fig. 2, and it will be seen that in either Fig. 1 or Fig. 2 the cost of producing the head 1 of the drum will be lower and the complete drum, will be lighter, but more rigid, and have greater heat radiating ability than a drum punched from one piece of metal and having the same rigidity and braking ability as the drum herein contemplated.

In the form shown in Fig. 3, the brake ring 2 is preferably made of cast iron and then the drum head 1 of aluminum can be cast onto the ring 2, rivet members 10 being cast integral with the head 1, forming rivets through a suitable number of holes in the ring 2. In this construction it is preferable to bulge the flange of the head 1 out slightly at 7 to give greater strength.

In Fig. 4 the drum head may be made of an aluminum or steel stamping shrunk on or riveted to the ring 2, as by means of rivets 11. The plate may also be ribbed to give additional strength.

The various figures indicate that my invention is susceptible to certain changes and I, therefore, do not desire to be limited, except as limited by the scope of the appended claims.

Having thus described my invention, what I claim is:

1. A brake drum comprising a punched metal portion and a cast metal portion fastened to the punched portion.

2. A brake drum comprising a pressed sheet metal portion which includes the head of the drum, and a cast metal portion fastened to the pressed portion and having as one of its functions the ability to radiate heat generated within the drum.

3. A brake drum comprising a pressed sheet metal head, and a cast brake ring of good braking metal fastened to said head.

4. A brake drum comprising a pressed sheet metal head, and a brake ring of cast iron fastened to the head, said ring having heat radiating fins thereon.

5. A brake drum comprising a cast brake ring having heat radiating fins thereon, and a drum head of different material secured to the brake ring.

6. A brake drum comprising a cast iron brake ring having heat radiating fins and a relatively thin metal drum head fastened to the brake ring.

7. A brake drum comprising, in combination, a cylindrical ring 2 forming a braking flange, and a separate plate 1 secured thereto at one edge.

8. A brake drum comprising, in combination, a cylindrical ring forming a braking flange, and a plate having a flange fitting over and secured to the edge of the ring.

9. A brake drum comprising, in combination, a cylindrical ring forming a braking flange, and a plate welded to the edge of the ring.

10. A brake drum comprising, in combination, a cylindrical ring forming a braking flange, and a plate having a flange fitting over and welded inside and outside to the edge of the ring.

11. A brake drum comprising, in combination, a cast ring formed with heat-radiating fins and with a cylindrical braking surface, and a separate plate secured to the edge of the ring.

In testimony whereof, I affix my signature.

JOHN RANDOLPH CAUTLEY.